United States Patent
Blake et al.

(10) Patent No.: US 6,741,755 B1
(45) Date of Patent: May 25, 2004

(54) SYSTEM AND METHOD PROVIDING MIXTURE-BASED DETERMINATION OF OPACITY

(75) Inventors: Andrew Blake, Stapleford (GB); Kentaro Toyama, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 562 days.

(21) Appl. No.: 09/747,603

(22) Filed: Dec. 22, 2000

(51) Int. Cl.$^7$ ............ G06K 9/36; G06K 9/42; G06K 9/40

(52) U.S. Cl. ......... 382/284; 382/257; 382/260; 382/266

(58) Field of Search ............ 382/173, 254, 382/256, 257, 260, 264, 266, 276, 282, 295, 302, 308, 251; 358/464

(56) References Cited

U.S. PATENT DOCUMENTS 5,768,438 A * 6/1998 Etoh ............... 382/251
5,784,064 A * 7/1998 Penna et al. .......... 345/422

OTHER PUBLICATIONS

Etoh et al, "template–based video coding with opacity representation", IEEE 1997.*
Wittenbrink et al., "Opacity–weighted color interpolation for volume sampling", IEEE 1998.*
Ramamurthy et al., Transparent VS. opque VS. translucent wavelength–routed optical networks, Dept. of ECE, university of california.*
S. Ghosal, et al., *Edge Detection Using Orthogonal Moment–Based Operators*, 11$^{th}$ *IAPR International Conference* on Pattern Recognition, Aug. 30–Sep. 3, 1992, p. 413–416.
Yu Xiaohan, *A New Algorithm for Texture Segmentation Based on Edge Detection*, Pattern Recognition, vol. 24 No. 11, p. 1105–1112.
S.S. Iyengar, *An Efficient Edge Detection Algorithm Using Relaxation Labeling Technique*, Pattern Recognition, vol. 28, No. 4, p. 519–536.
S. Ghosal, et al., *Orthogonal Moment Operators for Sub-pixel Edge Detection*, Pattern Recognition, vol. 26, No. 2, p. 295–306.
V. Ultre, et al., *Multispectral Edge Detection by Relaxation Algorithm*, Proceedings of the SPIE—The International Society for Optical Engineering, vol. 2666, p. 252–258.
Smith, A.R. and Blinn, J.F.; *Blue Screen Matting*, Proceedings of SIGGRAPH 96, Computer Graphics Proceedings, Annual Conference Series, pp. 259–268 (Aug. 1996, New Orleans, Louisiana). Addison Wesley. Edited by Holly Rushmeier. ISBN 0–201–94800–1.
Mitsunaga, T. and Yokoyama, T. and Totsuka, T.; *AutoKey: Human Assisted Key Extraction*, Proceedings of SIGGRAPH '95, Computer Graphics Proceedings, Annual Conference Series, pp. 265–272 (Aug. 1995, Los Angeles, California). Addison Wesley. Edited by Robert Cook. ISBN 0–201–84776–0.
Avrahami, G. and Vaughan, P.; *Sub–Pixel Edge Detection in Character Digitization*, Proceedings RIDT II, R. Morris and J. Audre Eds, CUP 1991, Raster Imaging & Digital Typogrpahy, pp. 54–64.
Mortensen, E. and Barrett, W.; *Intelligent Scissors for Image Composition*, Computer Graphics Proceedings, Annual Conference Series, 1995, pp. 191–198.
Toyama, K.; *Contours for Cutting, Tracking, and Rotoscoping*, Vision Technology Group: Machine Learning & Perception (74 pages).

* cited by examiner

*Primary Examiner*—Andrew W. Johns
*Assistant Examiner*—Amir Alavi
(74) *Attorney, Agent, or Firm*—Amin & Turocy, LLP

(57) ABSTRACT

A system is provided for selecting a foreground region of an image, given a set of pixels defining the boundary of the foreground region of the image. The system includes a component to dilate the pixel set and a component to determine a foreground value (F) and to determine an opacity value (a) based on estimated foreground and background values for each pixel of the dilated set to facilitate a separation of the region from background portions of the image.

24 Claims, 6 Drawing Sheets

SYSTEM AND METHOD PROVIDING MIXTURE-BASED DETERMINATION OF OPACITY

TECHNICAL FIELD

The present invention relates generally to computer systems, and more particularly to a system and method to enable smooth mixing and integration of a selected foreground image with an unassociated background image by determining mixture-based opacity values along a contour of the foreground image.

BACKGROUND OF THE INVENTION

Digital images and related image processing have created a profound impact in all aspects of modern society. From blockbuster movies to the classroom, from business presentations to the daily weather report, digital images affect and influence people—dozens, perhaps, hundreds of times per day. For example, with the advent of communications technologies such as the Internet, business persons, students, researchers and ordinary citizens routinely transmit and receive digital images in the normal course of daily activity. Thus, since digital images have become a staple in modern society, ever changing and more sophisticated requirements for image processing are consistently challenging systems designers and architects.

One such challenge relating to image processing is associated with seamlessly combining portions of a first image with portions of a second image. For example, when observing the nightly weather report, the image of the weather person is often interposed with a plurality of background screens depicting various weather patterns. In the case of high-tech movie special effects and/or other computer generated images, an object, person and/or scene portion, known as the foreground, is often digitally extracted from an associated background scene and placed into a second scene having entirely different backgrounds from the first scene. In order to accomplish this type of image extraction and migration however, it is important that remnants or artifacts of the first scene do not appear in the second scene, and that the extracted object, person or scene portion seamlessly migrate into the second scene. In other words, the migrated foreground image should appear without rough edges and appear as though the new background scene was the original background. Unfortunately, conventional image processing systems many times do not effectively achieve these goals.

One such conventional model for extracting foreground image regions from an associated background region relates to utilizing an artificial/engineered and/or clean background (e.g., blue screen), and extracting the foreground image from the artificial background via a background subtraction technique. This may be achieved by processing image pixels and determining whether a threshold level has been attained after subtracting known background pixel values from each pixel value in the image. For example, according to the conventional model, given the known background pixel values of the artificial background, the known background pixel value is subtracted from each pixel in the image and compared to a predetermined threshold. If the result of the subtraction is below the predetermined threshold, the pixel is assumed to be a background pixel and thus not assigned a value in the extracted image. If the result is above the predetermined threshold, the pixel is assumed to be a foreground pixel and thus retains its original value. Unfortunately, background subtraction and other extraction techniques may not cleanly separate foreground regions of the image and enable smooth placement of the foreground onto a new background. Some of the problems associated with these techniques relate to "bluescreen" reflections in the extracted foreground, potential "holes" in the foreground, wherein the values of the foreground and background are mixed, jagged edges along the contours of the extracted image, and "bleeding" of the previous background into the new background. Moreover, providing artificial clean backgrounds is often not possible and/or difficult to achieve.

In view of the above problems associated with conventional image processing systems, there is a need for a system and/or methodology to facilitate precise extraction of a foreground region of an image from an associated background region, and to enable smooth migration of the foreground region to other background regions.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology for enabling portions of image regions to be extracted from adjacent background regions via a mixture-based opacity determination near the contours of the extracted image region. In this manner, blurring effects and unwanted background portions are mitigated in the extracted image region. An extraction tool may be employed to return a set of pixels associated with the contour of an image foreground region. In accordance with the present invention, the set of pixels are dilated to include regions of blur relating to the contour. Each pixel in the dilated set is analyzed wherein two values are computed to separate the image foreground region from its background. These values may be determined as a foreground value and an alpha value. The dilation process may include a user selecting a width of dilation for the set of pixels. Once selected, a standard morphological algorithm of dilation may be applied to "widen" the set. It is to be appreciated that other techniques for performing dilation may be employed, and that some of these techniques may vary the degree of dilation for each pixel in the contour set.

Generally, because of image blurring, image pixels near a foreground/background boundary result in a mixture of both the foreground color and the background color. This mixture may be generally modeled linearly as follows: $I = \alpha F + (1-\alpha) B$, wherein I represents an actual pixel value, F is the foreground color, B is the background color, and $\alpha$ is the alpha value which represents a mixing ratio of foreground and background colors. Since an I value may be known from a given image, $\alpha$, F and B are to be determined.

Related to the image smoothness, it may be expected that a nearby pixel from the foreground side of a contour may have a value similar to the value that mixed with the background to generate I. Thus, according to one aspect of the invention, an F value for a given contour pixel may be borrowed from the nearest foreground pixel, defined as the pixel that is closet to the pixel in question, which is not in the dilated pixel set. It is to be appreciated that there are many other possibilities for determining the F value. For example, F values may be determined via (1) an average of several nearby foreground pixels, (2) a stochastically selected, weighted average of nearby pixels, (3) a pixel generated by a texture reconstruction process applied to nearby foreground pixels, as well as (4) a mixture of an I value and the pixel value generated by any of (1–3)) above. Similarly, a B value may be borrowed for a given contour pixel from the nearest background pixel. Utilizing the determined values for F and B, and knowing I, the value of alpha (α), which is the mixing ratio of foreground and background colors may be solved approximately, for example via the following equation:

$$\alpha = \frac{(I-B)\cdot(F-B)}{\|F-B\|^2}$$

After determining the mixing ratio, image pixels within the dilated region may be extracted and mixed with a subsequent background region. Thus, improved image extraction from a blurred background region may be achieved over conventional systems by determining alpha, F and B.

According to one aspect of the present invention, a system is provided for selecting a foreground region of an image, given a set of pixels defining the boundary of the foreground region of the image. The system includes a first component to dilate the pixel set and a second component to determine a foreground value (F) and to determine an opacity value (a) based on estimated foreground and background values for each pixel of the dilated set to facilitate a separation of the region from background portions of the image.

According to another aspect of the present invention, a method is provided for integrating extracted images. The method includes: selecting a set of contour pixels defining a foreground region of an image; dilating a set of adjacent pixels for each contour pixel; and utilizing a mixture-based computation for determining an opacity value (a) for each contour pixel and each pixel within the dilated set of adjacent pixels.

In accordance with another aspect of the present invention, a system is provided for extracting images. The system includes: means for selecting a set of contour pixels defining a foreground region of an image; means for dilating a set of adjacent pixels for each contour pixel. The system utilizes a mixture-based computation to determine an opacity value (a) for each contour pixel and each pixel within the dilated set of adjacent pixels.

According to another aspect of the present invention, a signal is provided for integrating extracted images. The signal includes communicating information associated with an image. A first component selects a set of contour pixels defining a foreground region of the image, and dilating a set of adjacent pixels for each contour pixel via the signal. A second component utilizes a mixture-based computation for determining an opacity value (a) via the signal for each contour pixel and each pixel within the dilated set of adjacent pixels to smoothly mix the foreground region of the image with a subsequent background region associated with another image. The signal is communicated over at least one of a network system and a wireless system.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
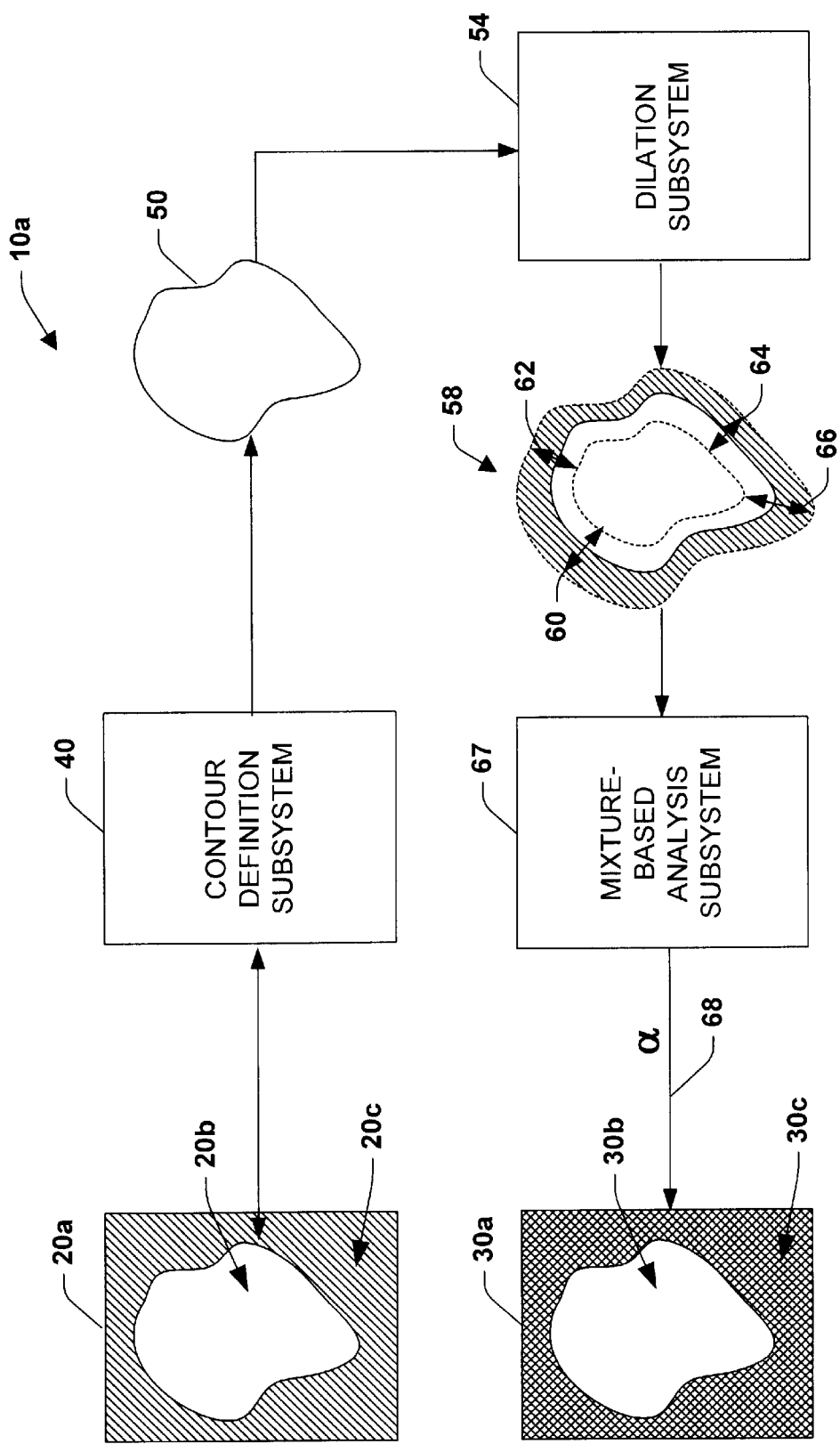
FIG. 1 is a schematic block diagram illustrating an image processing system in accordance with an aspect of the present invention.

The present invention is now described with reference to the drawings, wherein like reference numerals are used to refer to like elements throughout.

The present invention relates to a system and methodology to facilitate removal of a foreground region of an image from an associated background region and to enable smooth mixing of the foreground region with a second and/or subsequent background region. This may be achieved by selecting a chain and/or grouping of pixels defining a contour of the foreground region that is to be extracted from the background region. When the contour has been defined, a dilation is applied to image areas along the contour in order to expand the region of analysis. As will be described in more detail below, images may have regions of blur associated with the contour. By expanding the region of analysis along the contour, blurring effects are accounted for. The amount (e.g., width) of dilation may be user defined and/or analytically determined.

The chain of pixels defining the foreground region of the image generally includes a mixture of both desired foreground colors and background colors that are to be removed. A mixing ratio known as alpha which defines the mixing ratio of foreground colors and background colors may then be determined by computing the proportions of foreground and background assigned to each pixel within the dilated region of the image. Upon determining alpha, the extracted foreground image may be mixed with a subsequent background image wherein the pixel edges of the extracted image are mixed with the new background image according to the mixing ratio defined by alpha. Thus, smooth mixing of the extracted foreground with the subsequent background is achieved by determining alpha in accordance with the present invention.

Referring initially to FIG. 1, a system 10a illustrates an image processing system in accordance with an aspect of the present invention. An image 20a having both a foreground region 20b and a background region 20c is processed in accordance with the present invention, wherein the foreground region 20b is extracted from the image 20a and transferred to a second and/or subsequent image 30a, having a different background region 30c. A contour definition subsystem 40 is employed to define a chain or grouping of contour pixels 50 which are associated with the exterior of the foreground region 20b. The contour definition subsystem 40 may be substantially any well-known system for selecting the contour 50 of the foreground region 20b. These systems may include for example, "Intelligent Scissors" (as described in (Mortensen, E. N. and Barrett, W. A., "Intelligent scissors for image composition" SIGGRAPH 95 Proceedings, 1995) as well as other suitable systems that provide foreground pixel contour definitions/selections. These systems enable a user and/or system to select/define the exterior of the foreground region 20b (e.g., mouse selection, area defined by an overlaid object on the image) and output the chain or grouping of contour pixels 50 associated with the selection/definition of the foreground region 20b.

Upon selecting the contour pixels 50 of the image 20b, a dilation subsystem 54 is employed to expand the region associated with the contour pixels 50. A contour dilation 58 is illustrated at the output of the dilation subsystem 54, wherein the contour pixels 50 are expanded to include adjacent foreground portions 20b and background portions 20c from the image 20a. For example, four possible areas of dilation are illustrated at reference numerals 60, 62, 64, and 66. It is to be appreciated that reference numerals 60–66 are exemplary in nature and that all portions of the contour pixels 50 may be similarly expanded. As will be described in more detail below, the dilation 58 may be user defined or may be determined via analytical techniques. It has been observed that image 20a blurring may exist along regions of the contour pixels 50, wherein background and foreground colors may be mixed across several pixels near the contour. This may occur for various reasons, such as if the image 20a was digitally captured via a lens with inadequate focus, because of motion blur during capture, for example, and/or as a result of other well-known causes. Thus, by expanding the contour pixels 50 as depicted at reference numeral 58, blurring effects in the image 20a may be accounted for.

A mixture-based analysis subsystem 67 is employed to determine a mixing ratio alpha 68 to enable smooth mixing of the foreground region 20b with the background region 30c. By determining alpha 68, the amount of foreground color within the dilated regions associated with the contour pixels 50 may be determined. Additionally, the mixing ratio alpha 68 enables smooth mixing of the background 30c with the contour pixels 50 by enabling substantially the same proportion of the background region 30c to be mixed as was the proportion of the background region 20c. As will be described in more detail below, alpha may be determined by selecting foreground and background values along the boundary defined by the dilated region of the contour pixels 50. Upon determining these values, a mixture-based computation may be performed to determine alpha.

It is noted that before image processing commences in accordance with the present invention, that image processing techniques may be applied to smooth, filter, and/or otherwise preprocess the original input image 20a. For example, a Gaussian smoothing function may be applied to the image 20a in order to filter potential pixel-wide noise sources. Gaussian smoothing is performed by convolving the image 20a with a Gaussian operator which is defined below:

$$g(x, y) = \frac{1}{2\pi\sigma^2} e^{-(x^2+y^2)/2\sigma^2} \quad \text{Equation 1:}$$

wherein σ is the standard deviation representing the width of a Gaussian distribution. The shape of the distribution and hence the amount of smoothing can be controlled by varying σ. In order to smooth an image f(x,y), the image may be convolved with g(x,y) to produce a smoothed image s(x,y), wherein s(x,y)=f(x,y)*g(x,y).

Figure 2:
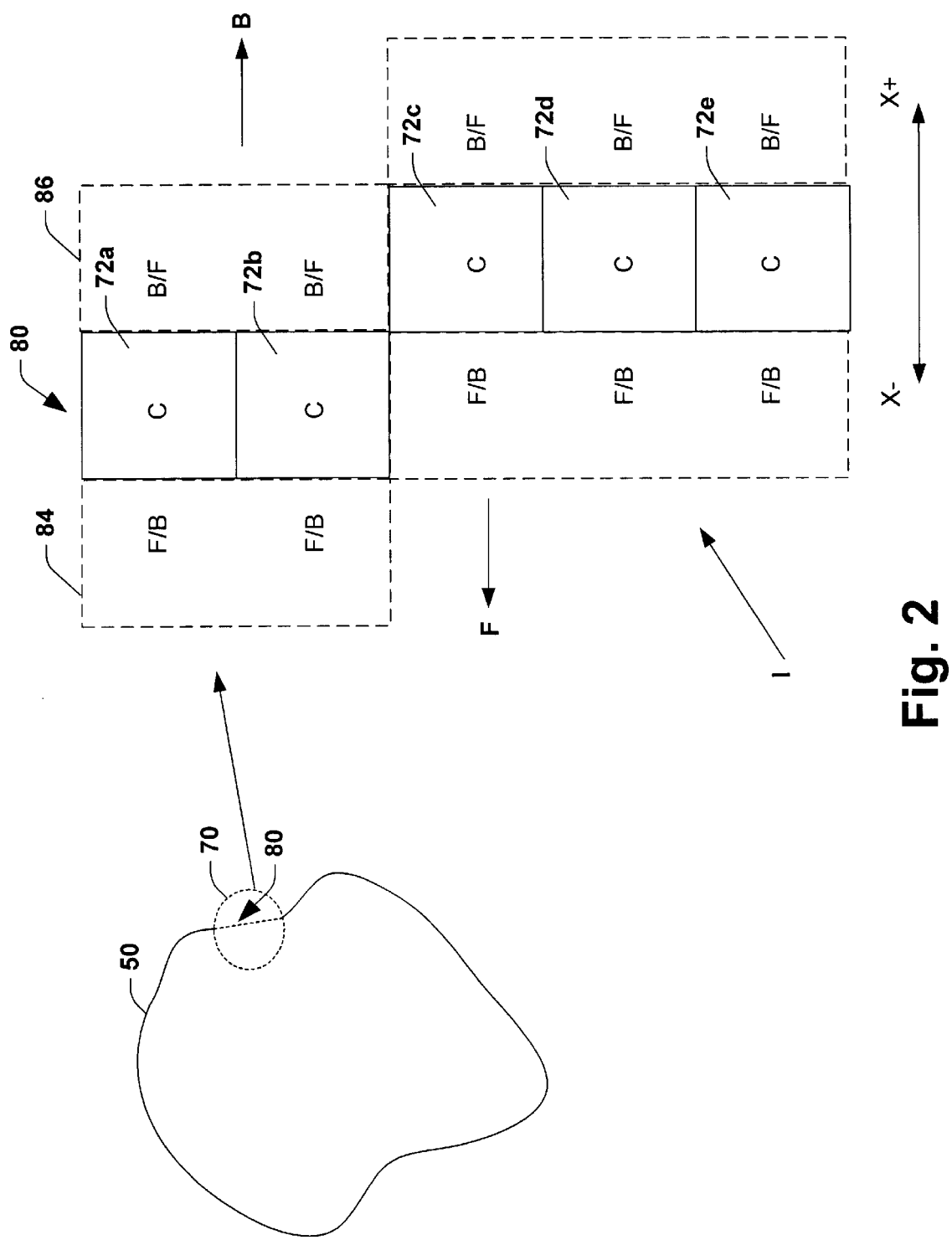
FIG. 2 is a diagram illustrating a selected contour edge within a subset of contour pixels in accordance with an aspect of the present invention.

Turning now to FIG. 2, a subset 70 of pixels associated with the contour pixels 50 having a contour edge 80 are illustrated in accordance with an aspect of the present invention. It is to be appreciated that the contour pixels 50 may include a plurality of pixels, wherein each pixel along the contour pixels 50 is processed as described below. For example, the subset of contour pixels 70 depicts five exemplary selected contour pixels 72a–72e. The pixels 72a–72e represent the contour edge 80 associated with the contour pixels 50 and are denoted by the letter "C". For exemplary purposes, the following discussion describes directions in relation to the contour pixels 72a–72e in terms of X+ and X−, however, it is to be appreciated that the directions are substantially in a perpendicular direction to the orientation of the contour pixels 50—regardless of the direction/axis nomenclature employed (e.g., X, Y, Z). For the purposes of the following discussion, X+ is understood to be in the direction from the contour pixels 72a–72e toward the background regions 20c of the image 20a, whereas X− is understood to be in the direction from the contour pixels 72a–72e toward the foreground regions 20b of the image 20a illustrated in FIG. 1.

As depicted in FIG. 2, regions of blur 84 and 86 may be associated with the selected contour pixels 72a–72e. The regions of blur 84 and 86 may have mixed portions of background and foreground colors or intensity as do the contour pixels 72a–72e. For example, with respect to the X− direction, the region of blur 84 includes pixels that are mixed, and denoted as F/B, wherein as the pixel distance is increased from the contour edge 80 in the X− direction, the pixel values generally begin to assume a foreground value, denoted as F. Similarly, with respect to the X+ direction, the region of blur 86 includes pixels that are mixed, and denoted as B/F, wherein as the pixel distance is increased from the contour edge 80 in the X+ direction, the pixel values generally begin to assume a background value, denoted as B. Since both the background and foreground colors are mixed within the pixels 72a–72e and associated regions of blur 84 and 86, the image pixel value (e.g., intensity value, color value) is described by a mixed value and is denoted by the letter (I).

Figure 3:
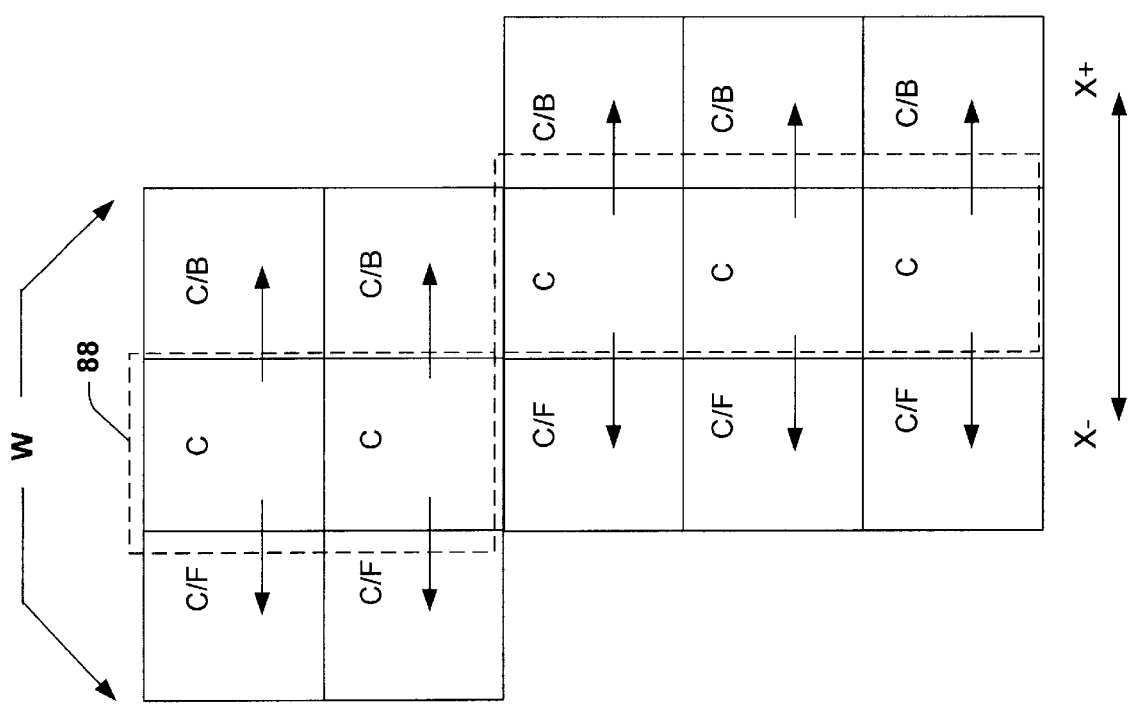
FIG. 3 is a diagram illustrating a dilated contour edge in accordance with an aspect of the present invention.

Referring now to FIG. 3, a dilated contour region, denoted by the letter "W" is illustrated in accordance with an aspect of the present invention. A selected contour region 88 includes a set of selected contour pixels and is denoted by the letter "C" as illustrated in FIG. 2. The pixels C that are identified by the contour definition subsystem 40 described above, are expanded to include other pixels within the set of the selected contour pixels 88. For example, pixels denoted as C/F are included which are determined in the X− direction from the contour pixels C. Pixels C/B are included which are determined in the X+ direction from the pixels C. As described above, the described directions are for exemplary purposes, wherein the described directions are generally perpendicular to the contour pixels C. Although the expanded width W of the selected contour pixels 88 depict one pixel of dilation in the X+ and X− direction, it is to be appreciated that larger regions of dilation may be selected— either manually and/or analytically as will be described in more detail below.

In accordance with one aspect of the present invention, the dilated contour region W may be determined morphologically via well-known image morphology algorithms. For example, a user may define the set of selected contour pixels 88 and specify a width of dilation. The morphology algorithm would then expand the contour region according to the width specified by the user to determine the set of pixels to be included within the specified width W. Alternatively, other analytic techniques may be employed to widen the set of selected contour pixels 88. For example, dilation may occur by expanding outward from the selected contour pixels 88 until a level of flatness occurs. As an example, flatness may be defined as a point at a distance away from the selected contour pixels 88 wherein the background or foreground colors assume substantially constant values. Image gradients may be computed in the X+ and/or X− directions, wherein if the gradient slope falls below a predetermined threshold, (e.g., slope near 0), a level of flatness may be assumed at the threshold point. The widening would thus continue from the selected contour pixels 88 until the desired level of flatness was determined. Other techniques for dilation may include employing a blur estimation wherein the image is processed in the frequency domain. This may be achieved by applying image filtering to the image pixels perpendicularly from the selected contour pixels 88, for example. At threshold points above and/or below high and low image frequency changes, as determined by the filtering, it may be determined that an image has transitioned from a region of substantial blur to a region substantially composed of foreground or background pixels, respectively, based upon the frequency changes.

Figure 4:
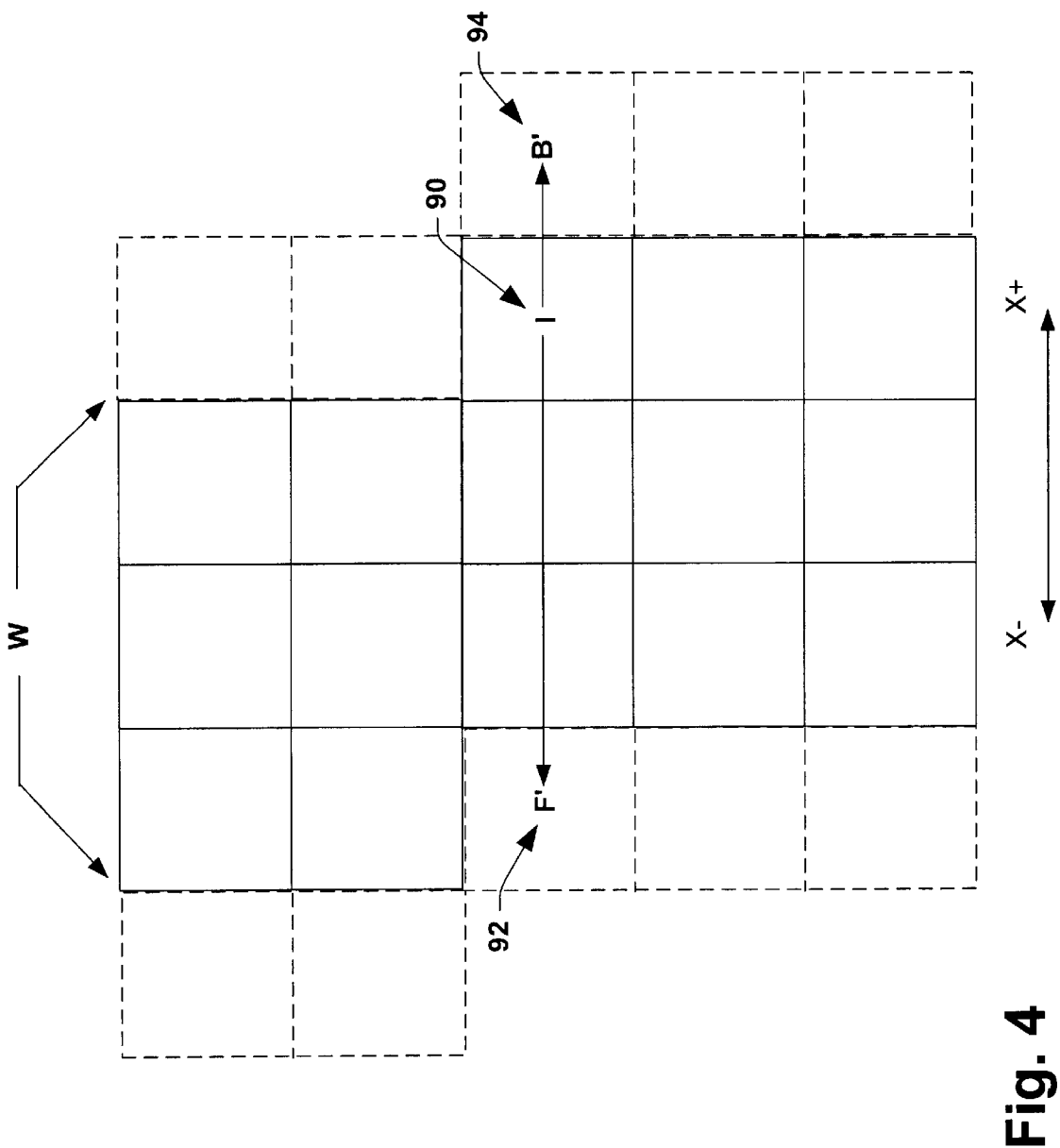
FIG. 4 is a diagram illustrating a background, foreground, and mixing ratio analysis in accordance with an aspect of the present invention.

Turning now to FIG. 4, a background determination, foreground determination, and mixing ratio analysis within a dilated contour region "W" is illustrated in accordance with an aspect of the present invention. Image pixels within the region W are modeled as a mixture of both foreground values and background values, wherein the values may be represented as intensity values and/or colors within the image. The mixture may be modeled linearly as follows: I=αF+(1−α)B, wherein I represents the actual pixel value, F is a foreground color near the dilated region W, B is a background color near the dilated region W, and α is the alpha value which represents the mixing ratio of foreground and background colors. Since the I value is known from a given image (e.g., reading pixel memory locations), α, F and B may be determined as described below.

The foreground value F may be selected as the color (or intensity value) that a pixel may assume had the pixel been entirely occupied by the extracted and/or cut-out object (e.g., area inside the contour 50 as depicted in FIG. 1). Because of image smoothness, it may be expected that a nearby pixel from the foreground side of the dilated region W may have a similar value. Thus, according to one aspect of the invention, the F value for a given contour pixel may be borrowed from the nearest foreground pixel to the dilated region W. It is to be appreciated that there are many other possibilities for determining the F value. For example, F values may be determined via (1) an average of several nearby foreground pixels, (2) a stochastically selected, weighted average of nearby pixels, (3) a pixel generated by a texture reconstruction process applied to nearby foreground pixels, as well as (4) a mixture of the I value and the pixel value generated by any of (1–3)) above. Values for B are similarly selected as values for F except that B values are selected from the background side (X-direction) of the dilated region W. An example pixel I is depicted at reference numeral 90. Values for F and B are selected according to one of the determinations described above. An F pixel 92 and B pixel are illustrated at reference numerals 92 and 94, respectively. It is to be appreciated that similar determinations are made for each pixel within the dilated region W.

The mixing ratio alpha is then determined by computing a mixture-based computation of opacity according to the following equation:

$$\alpha = \frac{(I-B)\cdot(F-B)}{\|F-B\|^2} \qquad \text{Equation 2:}$$

wherein, a dot product is represented in the numerator of Equation 2, and the square of the Euclidean distance between F and B is represented in the denominator.

The value for I may be assigned as F. Thus, after determining values for F and alpha, the image foreground region may be extracted and placed into a subsequent background region, wherein alpha is employed to smoothly mix the image foreground with the subsequent background. As an alternative to the image model described above, I=αF+(1−α)B, an alternative expression may be employed in order that the same foreground value is not assigned to each pixel within the dilated region W. This equation is as follows:

$$I = \beta * F + (1-\beta) * \left[\frac{1}{\alpha} * (F-B) + B\right] \qquad \text{Equation 3:}$$

wherein the symbol β, beta, may be a value selected by the user.

Figure 5:
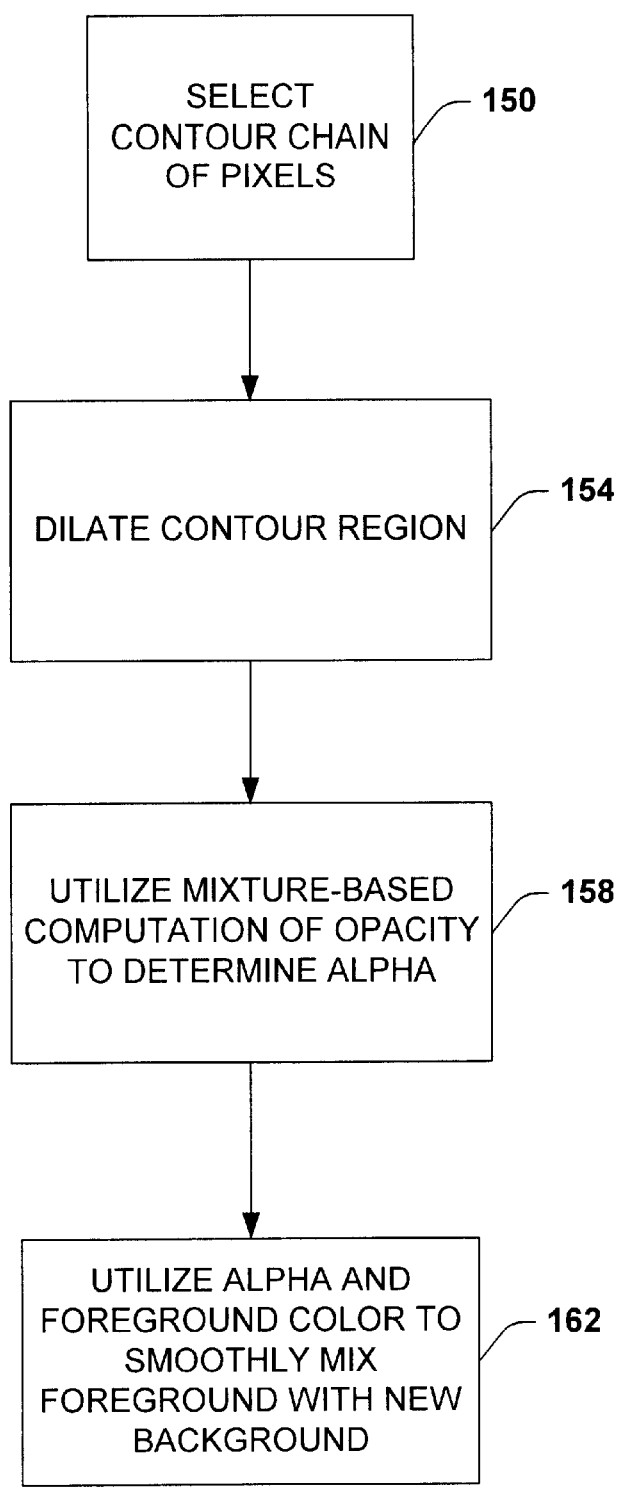
FIG. 5 is a flow chart diagram illustrating a methodology for enabling image extraction and smooth mixing with a new background in accordance with an aspect of the present invention.

FIG. 5 illustrates a methodology for providing smooth image mixing in accordance with an aspect of the present invention. While, for purposes of simplicity of explanation, the methodology is shown and described as a series of blocks, it is to be understood and appreciated that the present invention is not limited by the order of blocks, as some blocks may, in accordance with the present invention, occur in different orders and/or concurrently with other blocks from that shown and described herein. For example, those skilled in the art will understand and appreciate that a methodology could alternatively be represented as a series of interrelated states, such as in a state diagram. Moreover, not all illustrated blocks may be required to implement a methodology in accordance with the present invention.

Referring to FIG. 5, and proceeding to block 150, a set and/or chain of contour pixels is selected, wherein the perimeter of the foreground region within an image is identified as described above. At block 154, the set of pixels defined in block 150 are dilated to include pixels adjacent to the selected contour pixels. At block 158, a mixture-based computation of opacity, defining the mixing ratio alpha, is determined as described in Equation 1 above, after selecting background and foreground pixel values along the dilated contour. As described in Equation 2 above, an adjustment value, beta, may be employed to vary selection of the background and foreground colors along the dilated region when determining opacity values for alpha. At block 162, the alpha value is utilized to smoothly mix the selected foreground region of block 150 with a second and/or subsequent background region.

Figure 6:
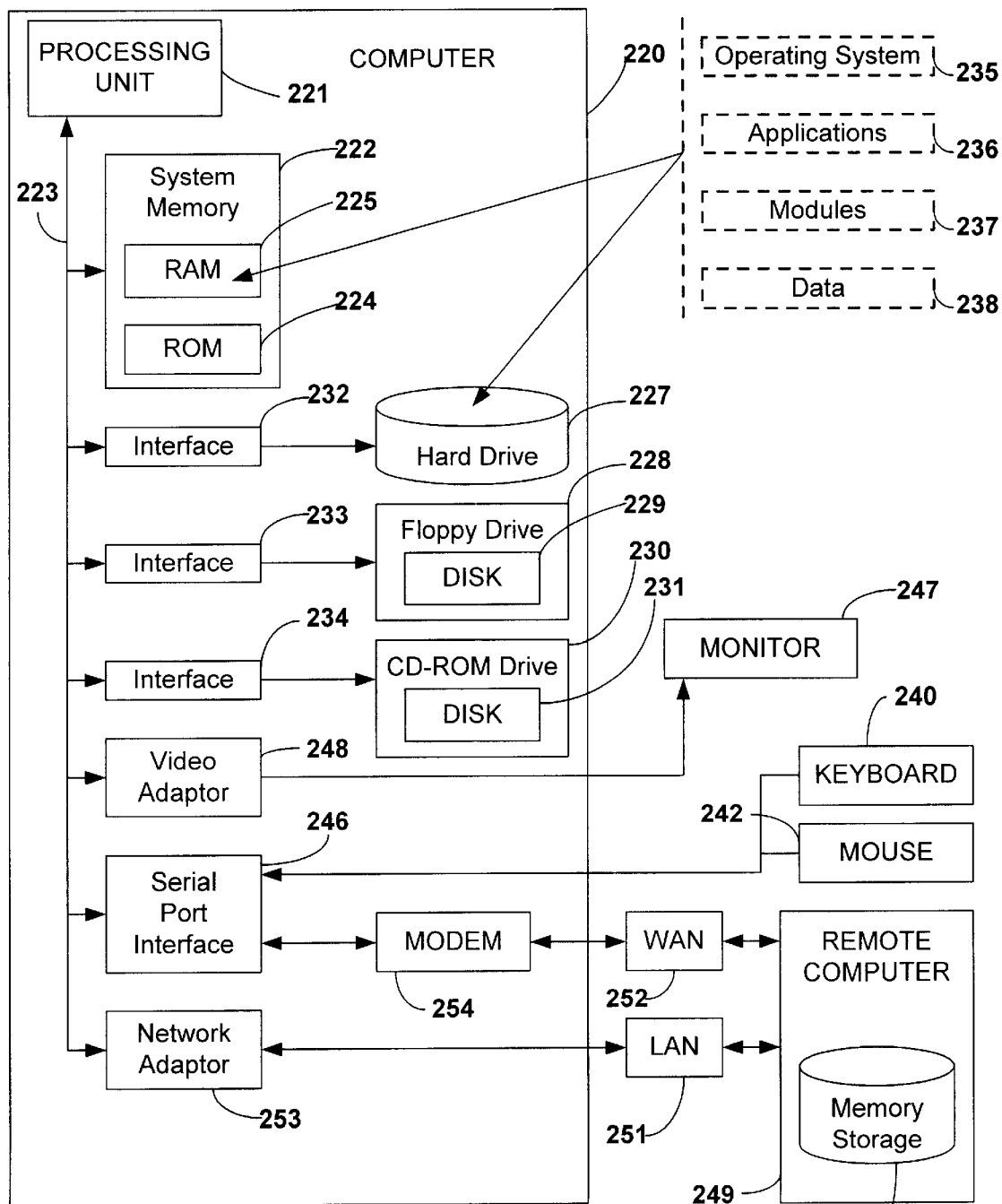
FIG. 6 is a schematic block diagram illustrating a suitable computing environment in accordance with an aspect of the present invention.

In order to provide a context for the various aspects of the invention, FIG. 6 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 6, an exemplary system for implementing the various aspects of the invention includes a conventional computer 220, including a processing unit 221, a system memory 222, and a system bus 223 that couples various system components including the system memory to the processing unit 221. The processing unit 221 may be any of various commercially available processors. It is to be appreciated that dual microprocessors and other multi-processor architectures also may be employed as the processing unit 221.

The system bus may be any of several types of bus structure including a memory bus or memory controller, a peripheral bus, and a local bus using any of a variety of conventional bus architectures. The system memory may include read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading from or writing to a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 225, including an operating system 235, one or more application programs 236, other program modules 237, and program data 238. The operating system 235 in the illustrated computer may be substantially any suitable operating system.

A user may enter commands and information into the computer 220 through a keyboard 240 and a pointing device, such as a mouse 242. Other input devices (not shown) may include a microphone, a joystick, a game pad, a satellite dish, a scanner, or the like. These and other input devices are often connected to the processing unit 221 through a serial port interface 246 that is coupled to the system bus, but may be connected by other interfaces, such as a parallel port, a game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The computer 220 may operate in a networked environment using logical connections to one or more remote computers, such as a remote computer 249. The remote computer 249 may be a workstation, a server computer, a router, a peer device or other common network node, and typically includes many or all of the elements described relative to the computer 220, although only a memory storage device 250 is illustrated in FIG. 6. The logical connections depicted in FIG. 6 may include a local area network (LAN) 251 and a wide area network (WAN) 252. Such networking environments are commonplace in offices, enterprise-wide computer networks, Intranets and the Internet.

When employed in a LAN networking environment, the computer 220 may be connected to the local network 251 through a network interface or adapter 253. When utilized in a WAN networking environment, the computer 220 generally-may include a modem 254, and/or is connected to a communications server on the LAN, and/or has other means for establishing communications over the wide area network 252, such as the Internet. The modem 254, which may be internal or external, may be connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 220, unless otherwise indicated. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for selecting a foreground region of an image, given a set of pixels defining the boundary of the foreground region of the image, comprising:
   a first component that dilates the pixel set and a second component to determine a foreground value (F) and to determine an opacity value (α) based on estimated foreground and background values for each pixel of the dilated set to facilitate a separation of the region from background portions of the image.

2. The system of claim 1, wherein the foreground value (F) and opacity value (α) are employed to mix the foreground region of the image with a subsequent image background region.

3. The system of claim 1, wherein image processing techniques are applied to at least one of smooth, filter, and preprocess the image.

4. The system of claim 1, wherein Intelligent Scissors are employed by the first component to define the foreground region of the image.

5. The system of claim 1, wherein the background portions and foreground regions of the image are mixed within pixels along the foreground region according to the equation I=αF+(1−α)B.

6. The system of claim 5, wherein the second component selects colors for each pixel on the set for the background portions or the foreground regions of the image according to borrowing a color value from a neighboring pixel location near the dilated set.

7. The system of claim 5, wherein the second component selects colors for each pixel on the set for the background portions or the foreground regions of the image according to an average of several pixels near the dilated set.

8. The system of claim 5, wherein the second component selects colors for each pixel on the set for the background portions or the foreground regions of the image according to a stochastically selected, weighted average of pixels near the dilated set.

9. The system of claim 5, wherein the second component selects colors for each pixel on the set for the background portions or the foreground regions of the image according to a pixel generated by a texture reconstruction process applied to pixels near the dilated set.

10. The system of claim 5, wherein the second component selects colors for each pixel on the set for the background portions or the foreground regions of the image according to a mixture of an intensity value and the pixel value generated by at least one of an average of several pixels near the dilated set, a stochastically selected, weighted average of pixels near the dilated set, and a pixel generated by a texture reconstruction process applied to pixels near the dilated set.

11. The system of claim 1, wherein the first component dilates the set of pixels via image morphology.

12. The system of claim 1, wherein the first component dilates the set of pixels via a flatness analysis.

13. The system of claim 1, wherein the first component dilates the set of pixels via a blur estimation.

14. The system of claim 1, wherein the second component determines opacity values (α) according to the following equation:

$$\alpha = \frac{(I-B)\cdot(F-B)}{\|F-B\|^2}.$$

15. The system of claim 1, wherein the second component determines alternative foreground and background pixel values according to the following equation:

$$I = \beta * F + (1-\beta) * \left[\frac{1}{\alpha} * (F-B) + B\right].$$

16. A method for integrating extracted images, the method comprising:
   selecting a set of contour pixels defining a foreground region of an image;
   dilating a set of adjacent pixels for each contour pixel; and
   utilizing a mixture-based computation for determining an opacity value (α) for each contour pixel and each pixel within the dilated set of adjacent pixels.

17. The method of claim 16, further comprising,
   utilizing the opacity value (α) to smoothly mix the foreground region of the image with a subsequent background region associated with another image.

18. The method of claim 17, wherein the opacity value (α) is determined according to the following equation:

$$\alpha = \frac{(I-B)\cdot(F-B)}{\|F-B\|^2}.$$

19. A computer-readable medium having computer-executable instructions for performing the method of claim 16.

20. A system for extracting images, comprising:
   means for selecting a set of contour pixels defining a foreground region of an image;
   means for dilating a set of adjacent pixels for each contour pixel; and
   utilizing a mixture-based computation to determine an opacity value (α) for each contour pixel and each pixel within the dilated set of adjacent pixels.

21. The system of claim 20, further comprising,
   means for utilizing the opacity value (α) to smoothly mix the foreground region of the image with a subsequent background region associated with another image.

22. The system of claim 20, further comprising, means for smoothing, filtering, and preprocessing the original input image.

23. A signal that facilitates combining at least one extracted foreground image with at least one background image, comprising:
   a signal to communicate information associated with an image;
   a first component to select a set of contour pixels to define a foreground region of the image, and to dilate a set of adjacent pixels for each contour pixel via the signal; and
   a second component utilizing a mixture-based computation to determine an opacity value (α) via the signal for each contour pixel and each pixel within the dilated set of adjacent pixels to smoothly mix the foreground region of the image with a subsequent background region associated with another image.

24. The signal of claim 23, wherein the signal is communicated over at least one of a network system and a wireless system.

* * * * *